(12) United States Patent (10) Patent No.: US 12,571,286 B2
Hickman (45) Date of Patent: Mar. 10, 2026

(54) UMBILICAL

(71) Applicant: ONESUBSEA AS, Lysaker (NO)

(72) Inventor: David Hickman, Mobile, AL (US)

(73) Assignee: ONESUBSEA AS, Lysaker (NO)

( * ) Notice: Subject to any disclaimer, the term of this patent is extended or adjusted under 35 U.S.C. 154(b) by 340 days.

(21) Appl. No.: 18/034,687

(22) PCT Filed: Nov. 4, 2021

(86) PCT No.: PCT/EP2021/080633
§ 371 (c)(1),
(2) Date: Apr. 29, 2023

(87) PCT Pub. No.: WO2022/096570
PCT Pub. Date: May 12, 2022

(65) Prior Publication Data
US 2023/0392477 A1 Dec. 7, 2023

(30) Foreign Application Priority Data
Nov. 5, 2020 (NO) .................................... 20201206

(51) Int. Cl.
*F16L 1/14* (2006.01)
*B21C 37/20* (2006.01)
(Continued)

(52) U.S. Cl.
CPC .......... *E21B 41/0007* (2013.01); *B21C 37/20* (2013.01); *E21B 43/0107* (2013.01); *F16L 9/19* (2013.01); *F16L 13/02* (2013.01)

(58) Field of Classification Search
CPC ............. E21B 41/0007; E21B 43/0107; E21B 17/017; E21B 17/04; E21B 17/206;
(Continued)

(56) References Cited

U.S. PATENT DOCUMENTS 2,098,752 A * 11/1937 Miller ....................... F16B 7/00
29/463
2,708,306 A * 5/1955 Lampton ................. B21C 37/26
228/231
(Continued)

FOREIGN PATENT DOCUMENTS

WO WO-2006049572 A1 11/2006
WO WO-2009083937 A2 7/2009
(Continued)

OTHER PUBLICATIONS

Figenschou Arild et al: "OTC-27798-MS New Umbilical Manufacturing Method Eliminates Weight Limitation", May 1, 2017 (May 1, 2017), pp. 1-15, XP055889720, [retrieved on Feb. 9, 2022].
(Continued)

*Primary Examiner* — Edwin J Toledo-Duran
(74) *Attorney, Agent, or Firm* — Kyle R. Miiller

(57) ABSTRACT

The invention relates to an umbilical for use between an offshore construction (10) and a seabed installation (20), comprising one or more of longitudinal umbilical elements, such as one or more filler element, one or more signal cable, one or more fiber optic, one or more electrical power cable, and/or one or more load carrying element like carbon fiber rod, the umbilical further comprises at least one fluid pipe (1*a*, 1*b*) arranged within the umbilical (1), the longitudinal umbilical elements (1*a*, 1*b*) and the at least one fluid pipe (1*a*, 1*b*) are either laid in a continuous helix, or alternatingly/ oscillatory laid within the umbilical. The at least one fluid pipe (1*a*, 1*b*) is a mix of at least one seamless pipe (1*a*) and at least one seam-welded pipe (1*b*), the at least one seamless pipe (1*a*) and the at least one seam-welded pipe (1*b*) are spliced together at one or more predetermined locations in the longitudinal direction of the umbilical (1). The invention further relates to a use and a method for arranging the
(Continued)

umbilical between the sea-surface offshore construction (10) and a seabed subsea installation (20).

14 Claims, 2 Drawing Sheets

(51) Int. Cl.
| | | |
|---|---|---|
| *E21B 41/00* | (2006.01) | |
| *E21B 43/01* | (2006.01) | |
| *F16L 9/19* | (2006.01) | |
| *F16L 13/02* | (2006.01) | |

(58) Field of Classification Search
CPC .. E21B 43/01; B21C 37/20; F16L 9/19; F16L 13/02; F16L 11/14; F16L 11/22; F16L 1/14; F16L 9/17; F16L 25/14; B23K 2101/06; B21D 5/10
See application file for complete search history.

(56) References Cited

U.S. PATENT DOCUMENTS

| | | | | | |
|---|---|---|---|---|---|
| 3,163,183 | A | * | 12/1964 | Sagara | F16L 9/04 |
| | | | | | 138/171 |
| 4,111,575 | A | * | 9/1978 | Hoshino | F16B 7/1418 |
| | | | | | 403/373 |
| 4,147,383 | A | * | 4/1979 | Schluter | F16L 37/123 |
| | | | | | 285/373 |
| 4,176,865 | A | * | 12/1979 | Felton | F16L 23/04 |
| | | | | | 285/903 |
| 4,196,307 | A | * | 4/1980 | Moore | H01B 7/045 |
| | | | | | 57/221 |
| 4,653,541 | A | * | 3/1987 | Oehlschlaeger | F17D 5/04 |
| | | | | | 138/104 |
| 4,843,713 | A | * | 7/1989 | Langner | F16L 9/18 |
| | | | | | 29/469 |
| 4,979,296 | A | * | 12/1990 | Langner | F16L 9/18 |
| | | | | | 29/469 |
| 5,190,102 | A | * | 3/1993 | Arterbury | B01D 29/15 |
| | | | | | 166/228 |
| 5,720,834 | A | * | 2/1998 | Steele | B29C 63/10 |
| | | | | | 156/162 |
| 5,813,106 | A | * | 9/1998 | Haug | H01B 7/0072 |
| | | | | | 29/429 |
| 6,382,318 | B1 | * | 5/2002 | Whitlock | B01D 29/111 |
| | | | | | 166/278 |
| 6,689,231 | B1 | * | 2/2004 | Kangas | F16L 9/19 |
| | | | | | 138/131 |
| 2003/0103811 | A1 | * | 6/2003 | Grimseth | F16L 9/19 |
| | | | | | 405/157 |
| 2006/0193572 | A1 | * | 8/2006 | Mjelstad | H01B 9/003 |
| | | | | | 385/101 |
| 2009/0277646 | A1 | | 11/2009 | Guven | |
| 2011/0005795 | A1 | * | 1/2011 | Deighton | H01B 7/045 |
| | | | | | 174/47 |
| 2012/0234578 | A1 | * | 9/2012 | Figenschou | H01B 7/045 |
| | | | | | 174/116 |
| 2017/0343142 | A1 | * | 11/2017 | Kim | F16L 37/0927 |
| 2019/0346071 | A1 | * | 11/2019 | Hedblom | E21B 41/0007 |
| 2021/0071516 | A1 | * | 3/2021 | Froböse | E21B 47/12 |
| 2021/0071783 | A1 | * | 3/2021 | Safari | B23K 9/18 |

FOREIGN PATENT DOCUMENTS

| | | | |
|---|---|---|---|
| WO | WO-2013083154 | A1 | 6/2013 |
| WO | WO-2013083664 | A2 | 6/2013 |
| WO | WO-2014086418 | A1 | 6/2014 |
| WO | WO-2016062681 | A1 | 4/2016 |
| WO | WO-2018148718 | A1 | 8/2018 |
| WO | WO-2019123017 | A1 | 6/2019 |
| WO | WO-2019129862 | A1 | 7/2019 |

OTHER PUBLICATIONS

European Patent Office, International Search Report for International Application No. PCT/EP2021/080633, dated Dec. 5, 2022.

\* cited by examiner

UMBILICAL

CROSS-REFERENCE TO RELATED APPLICATION

This application is a national stage entry under 35 U.S.C. 371 of International Application No. PCT/EP2021/080633, filed Nov. 4, 2021, which claims priority to Norway application No. 20201206, filed Nov. 5, 2020.

TECHNICAL FIELD

The invention relates to an umbilical and especially a predefined length of an umbilical, including one or more of traditional longitudinal elements, which longitudinal umbilical elements are either laid in a continuous helix, or alternatingly/oscillatory laid.

BACKGROUND ART

Seam welded tubes are generally less expensive than pilgered seamless tubes. Because of this, there is an economic driver to include the seam welded tubes into the subsea umbilical.

However, this is frequently not been done, due to a stigma in the industry to using the seam welded tubes in dynamic applications. This is due to the susceptibility for there to be defects where the weld beads cross. This could typically occur due to a biased joint between two pieces of strip and longitudinal seam or at a girth (orbital) weld and the longitudinal seam.

WO2016062681 relates to a seamless tube for use in a dynamic sector between the sea surface and the seabed. The publication describes further a reduction of the cross-sectional area of the tubes within the umbilical in order to provide an umbilical that may bear its own weight at increasingly greater depths and further sustain the stresses that it is subject to in the sea.

The publication also suggest to use a welded tube instead of the seamless tube. There is only a suggestion to use either and the publication do not provide any suggestion to a simple, cost-efficient and robust umbilical that may extend in both dynamic and static areas in the sea and at the sea bottom.

WO06049572 relates to the making the alloy which can be used for either seamless or seam-welded tubes, singularly.

WO19129862 relates to a system having an inner structure with a system comprising at least one inner tube made of stainless steel and at least one sensor to measure the at least one condition of the system. The tube may be either seamless or longitudinally welded.

There is an object of the invention to provide an umbilical that is cost efficient and at the same time maintains the strength of the umbilical in the whole length of the umbilical when in use.

An advantage of the umbilical according to the invention is that by having a predefined length of seamless and seam-welded tubes arranged into the same umbilical line it is possible to gain the benefit of both. Seamless would be used in dynamic sections where the umbilical has a higher exposure to wear, and seam-welded would be used in static sections, where the umbilical is less exposed to wear from the environment. The umbilical is thus adapting to the different sections in an optimal way, both through an economical, safety and fatigue resistant point of view.

SUMMARY OF INVENTION

The invention relates to an umbilical, comprising one or more of traditional longitudinal umbilical elements, such as a filler element, a signal cable, fiber optic, electrical power cable and/or a load carrying element like carbon fiber rods, the umbilical further comprises at least one fluid pipe, said longitudinal umbilical elements and the at least one fluid pipe are either laid in a continuous helix, or alternatingly/oscillatory laid. The at least one fluid pipe is a mix of seamless pipe and seam-welded pipe, said pipes are spliced together at one or more predetermined locations in the longitudinal direction of the umbilical.

Preferably, the at least one seamless pipe and/or at least one seam-welded pipe is made of steel.

Preferably, the material of the at least one seamless pipe and the at least one seam-welded pipe is super duplex stainless steel.

Preferably, said at least one seam welded pipe and said at least one seamless pipe are spliced by means of a weld, such as butt weld.

Preferably, said at least one seam welded and at least one said seamless pipe are joined and spliced together by means of a transition piece, said transition piece is adapted to be welded at one end to the seamless pipe and at the other end adapted to be welded to the seam-welded pipe in order to obtain a continuous pipe length of different pipes in the umbilical.

Preferably, the position of the predetermined location when in use is situated in a dynamic section of the umbilical located between the sea surface and the seabed, not including a bend area of the umbilical, such as a sag bend, a hog bend, a touch down point or a bend stiffener.

Preferably, the position of the predetermined location when in use is situated in a static section of the umbilical located at the seabed.

Preferably, the at least one seamless pipe and the at least one seam-welded pipe have different nominal cross-sectional geometry.

The invention further relates to use of at least one seam-welded pipe to replace at least one seamless pipe in a static section of an umbilical arranged at the seabed.

The invention also relates to a method for arranging an umbilical, comprising one or more of traditional longitudinal umbilical elements, such as a filler element, a signal cable, fiber optic, electrical power cable and/or a load carrying element like carbon fiber rods, the umbilical further comprises at least one fluid pipe, said longitudinal umbilical elements and the at least one fluid pipe are either laid in a continuous helix, or alternatingly/oscillatory laid, the method comprising the steps of:

arranging at least one seamless pipe in a part of the umbilical situated in a high fatigue area, such as a dynamic area of the umbilical positioned between the sea-surface and the seabed when in use, arranging at least one seam welded pipe in a part of the umbilical situated in a low fatigue area, such as a static area on the seabed, when in use.

Preferably, the method further comprises the splicing of the at least one seam welded pipe and the at least one seamless pipe through welding.

Each seam welded pipe is spliced or welded with each seamless pipes to obtain a longitudinal continuous pipe within the umbilical.

DETAILED DESCRIPTION OF THE INVENTION

With the term umbilical, is meant a cable intended for use between a topside construction offshore and the seabed. The umbilical usually has various supply tubes, cables etc within the umbilical for supply from topside construction to the seabed. The supply may be for instance high power or other electric signals, hydraulic fluid and/or fiberoptic signal. The umbilical may include one or more of traditional umbilical elements such as one or more filler elements, one or more steel pipes, one or more signal cables, one or more fiber optics, one or more electrical power cables or one or more load carrying elements like carbon fiber rods. The one or more longitudinal elements are either laid in a continuous helix, or alternating/oscillatory laid.

The term "seamless tube" or "seamless umbilical" is an umbilical or part of an umbilical where the fluid pipe is typically manufactured from a solid billet that has been extruded into a seamless pipe. This pipe is then reduced to a smaller size using pilgering and/or cold drawing. Pilgering, also known as cold rolling, uses two rollers and a mandrel to control the reduction of the tubing. The process is known per se.

The term "welded tube" or "welded umbilical" is an umbilical or part of an umbilical where the fluid pipe is typically manufactured using flat strip that is roll formed into a circular cross section and then longitudinally welded.

The welded tubing is typically much cheaper than the seamless tubing. However, the welded tubing is less resistant to fatigue than the seamless tubing.

The term dynamic section is to be interpreted as the section where the umbilical when in use is extending between the topside construction and the seabed. This means the area where the umbilical is adapted to be suspended and thus influenced by waves and current in the sea.

The term static section is to be interpreted as the section where the umbilical when in use is extending along the seabed towards the installation at the seabed. This area is normally less influenced by external forces, like waves and current.

Figure 1:
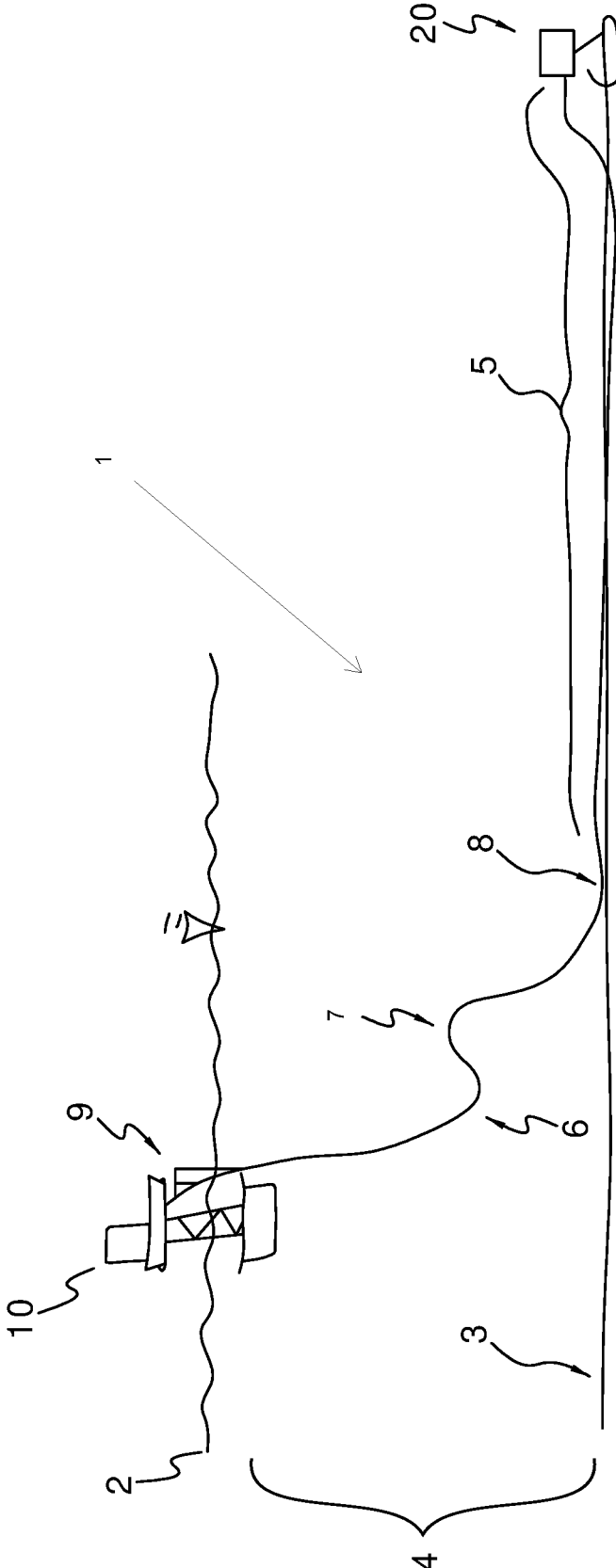
FIG. 1 shows an umbilical according to the invention having different areas or length from topside to the seabed.

FIG. 1 shows an overview of an umbilical 1 extending from an offshore construction 10 at the sea surface 2 to a seabed installation 20 at the seabed 3.

The offshore construction 10 may be various constructions, both floating and fixed installations offshore. This may for instance be oil platform constructions, offshore wind generators etc. These are known per se.

The seabed installation 20 may also be any types of installations arranged at the seabed that requires supply from the topside and is known per se.

The umbilical 1 is extending in different areas or sections from the offshore construction 10 to the seabed installation 20.

FIG. 1 shows a typical extension of the umbilical 1 from the topside construction 10 towards the seabed installation 20. The umbilical 1 extends in two main areas or sections; a dynamic section 4 extending from the topside construction 10 at the sea surface 2 to the seabed 3. The umbilical 1 further extends in a static section 5 along the seabed 3.

In the dynamic section 4, the umbilical 1 typically follows an S-curve as shown in the FIG. 1. The umbilical 1 has normally a bottom point 6 and a vertex 7 arranged between the sea surface 2 and the seabed 3. This is called a lazy wave configuration. The bottom point 6 is normally called a sag bend 6. This makes a U-bend at a defined area in the sea below the sea surface 2 and above the seabed 3. The vertex 7 is normally called a hog bend 7. This makes an inverse U-bend at a defined area in the sea below the sea surface 2 and above the seabed 3.

By arrangement of the part of the umbilical 1 in the dynamic section 4 in this lazy wave configuration, is to reduce tension and displacement on the seabed 3 of the part of the umbilical 1 arranged in the dynamic section 4, ie a dynamic part of the umbilical 1. This is only an example design of the umbilical 1 in the dynamic section 4. Other arrangement may be possible. The umbilical 1 may for instance follow a free hanging catenary (not shown) where the umbilical 1 extends in a sloped curve from the offshore construction 10 towards the seabed 3.

The umbilical 1 is normally hanging or is suspended from a bend stiffener 9 arranged in connection with the offshore structure 10. The bend stiffener 9 is known per se and will not be explained further.

The transition point between the dynamic section 4 and the static section 5, is called a touch down point 8 and is further illustrated in the FIG. 1.

The dynamic section 4 of the umbilical 1, is the area where the umbilical 1 is exposed to the highest risk of fatigue. The areas of the bend stiffener 9, the sag bend 6, the hog bend 7 and the touch down point 8, are especially exposed to the risk of fatigue due to forces, such as current and waves, in the sea. In these areas, there is thus a necessity that the umbilical 1 has the ability to withstand these forces to avoid fatigue.

In the static section 5 of the umbilical 1, the umbilical 1 is less influenced by forces causing fatigue since the umbilical 1 in this section rests on the seabed 3.

This has resulted in that an umbilical 1 with a seamless tube or pipe 1a has traditionally been used throughout the whole umbilical 1 from the sea surface to the seabed 3 to avoid the risk of failure of the tube.

The umbilical 1 according to the invention has however been made to adapt to the various condition from the offshore construction 10 to the seabed installation 20.

The umbilical according to the invention has pilgered seamless tubes or pipes 1a used in the dynamic section 4 of the umbilical 1. The seamless tube or pipes 1a are at least used in the areas of highest fatigue such as the portion of the umbilical 1 in the bend stiffener 9 at the exit of the offshore structure 10, such as an I-tube, J-tube or porch. The pilgered seamless tubes or pipes 1a would also be good to use in the hog bend 7, sag bend 6 and the touch down point 8. However, a transition point 11, 13 between a seamless 1a and seam-welded tube 1b must not be in these areas since these areas experience a high degree of fatigue due to forces acting in these areas.

In the static section 5, the umbilical is less exposed to fatigue and a less wear resistant tube may be used. In these areas a seam welded tube or pipe 1b may be used. The seam welded tube or pipe 1b may also be used in the area(s) between the bends 6, 7, 8, 9. The FIG. 1 illustrates the dynamic section 4 length from the topside construction 10 to the seabed installation 20. According to the mentioned embodiment above where seam-welded tubes are used between the bends, there would be defined static sections 5 in the areas between the bends 9, 6, 7, 8, such as in the longitudinal length some distance below the bend stiffener 9 and some distance above the hog bend. Further example could be some distance below the hog bend 7 and some distance away from the touch down point 8 at the seabed 3.

The seamless and seam welded tube or pipe 1*a*, 1*b* of one umbilical segment must be joined together connecting to the seamless or seam welded tube or pipe 1*a*, 1*b* of other umbilical segments to form one single umbilical that is adapted to extend from the offshore construction at the sea surface 2 towards the subsea equipment at the seabed 3. The umbilical 1 comprises thus a number of seam-welded tubes or pipes 1*b* and seamless tubes 1*a* welded together at the inside of the umbilical 1. In addition to one or more of the seamless or seam-welded tubes 1*a*, 1*b*, the umbilical 1 could have one or more of the other traditional longitudinal umbilical elements within the umbilical 1. These may be one or more filler elements, one or more signal cables, one or more fiber optics, one or more electronic power cables or high-power cables, load carrying elements. A suitable number of elements 1*a*, 1*b* may be laid in a continuous helix, or alternatingly/oscillatory laid forming the umbilical 1.

The seamless tube or pipe 1*a* and the seam-welded tube or pipe 1*b* may be made of steel. Further, the seamless tube or pipe 1*a* may be of super duplex stainless steel.

Figure 2:
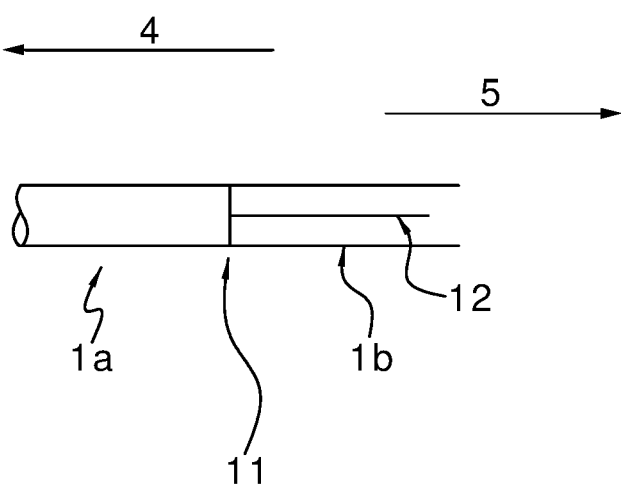
FIG. 2 shows a first embodiment of the invention where a part of the umbilical having a transition weld between a seamless tube to a seam welded tube.
Figure 3:
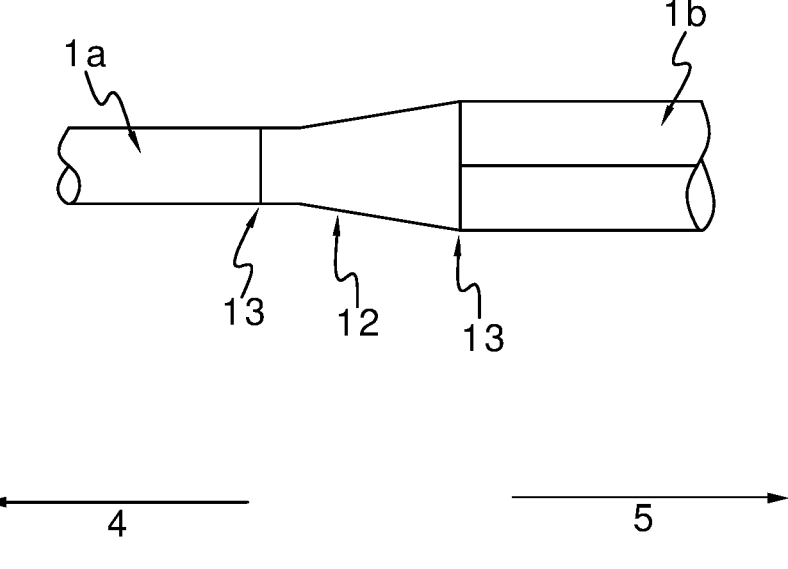
FIG. 3 shows a second embodiment of the invention where a part of the umbilical with transition between a seamless tube to a seam-welded tube via an adapter fitting.

FIGS. 2 and 3 show a first and second embodiment of connecting the seamless tube 1*a* to the seam-welded tube 1*b* in the longitudinal direction.

The connection is preferably performed at distance past the areas of high fatigue, such as past the touch down point 8 in the static section 5 of the umbilical 1.

FIG. 2 shows a first embodiment of a possible joint, where an orbital weld (transition point) 11 could be made to join the pilgered seamless tube 1*a* and the seam welded tube 1*b*. The orbital weld is also called transition weld 11 and is a weld extending along the periphery of the diameter of the tubes. The transition weld 11 manage to join the tubes even if there is a change in wall thickness or diameter. This is further illustrated in FIG. 2.

The welding of the seamless tube 1*a* and seam-welded tube 1*b* together could not be considered as a straightforward process. It requires a welding procedure to join the seamless tube 1*a* and the seam-welded tube 1*b* together in addition to doing all the work to make the tubes for the umbilical.

FIG. 3 shows a second embodiment of the invention. In this embodiment, there is used of an adapter or a machined fitting 12 to make the transition between the seamless tube 1*a* and the seam welded tube 1*b*. This machined fitting 12 is particularly preferable when the change between the seamless tube 1*a* to the seam welded tube 1*b* is too great for a transition weld 11. The fitting 12 would have welds (transition points) 13 on both sides and, if required, a transition in geometry to adapt to the different tube sizes as shown in FIG. 3.

The present invention has been described with reference to a preferred embodiment and some drawings for the sake of understanding only and it should be clear to persons skilled in the art that the present invention includes all legitimate modifications within the ambit of what has been described hereinbefore and claimed in the appended claims.

The invention claimed is:

1. An umbilical for use between an offshore construction and a seabed installation, the umbilical comprising:
   one or more longitudinal umbilical elements; and
   a fluid pipe arranged within the umbilical, the fluid pipe extending a length from a first end of the fluid pipe to a second end of the fluid pipe, the fluid pipe including:

a first portion including a seamless pipe, wherein the first portion extends a first portion of the length; and
   a second portion including a seam-welded pipe, wherein the second portion extends a second portion of the length, wherein the first portion of the length and the second portion of the length do not overlap, and wherein the first portion of the fluid pipe is spliced to the second portion of the fluid pipe at one or more predetermined locations along the length of the fluid pipe, and wherein the one or more longitudinal umbilical elements and the fluid pipe are laid in a continuous helix within the umbilical.

2. The umbilical according to claim 1, wherein the first portion of the fluid pipe is disposed in a bend stiffener coupled to an offshore structure, wherein the umbilical is between an offshore construction and a seabed installation.

3. The umbilical according to claim 1, wherein the first portion of the fluid pipe is situated in a dynamic section between an offshore structure and a seabed, wherein the umbilical is between the offshore construction and the seabed installation.

4. The umbilical according to claim 1, wherein the second portion of the fluid pipe is situated in a static section where the umbilical extends along a seabed to a seabed installation, wherein the umbilical is between an offshore construction and the seabed installation.

5. The umbilical according to claim 1, wherein the one or more predetermined locations are situated away from area(s) of the umbilical exposed to the highest fatigue, wherein the umbilical is between an offshore construction and a seabed installation.

6. The umbilical according to claim 1, wherein at least one of the seamless pipe or the seam-welded pipe is made of steel.

7. The umbilical according to claim 1, wherein at least one of the seamless pipe or the seam-welded pipe is made of super duplex stainless steel.

8. The umbilical according to claim 1, wherein the seam-welded pipe or the seamless pipe is spliced by welding.

9. The umbilical according to claim 1, wherein the seam-welded pipe and the seamless pipe are spliced together by a transition piece, and wherein the transition piece is configured to be welded at one end to the seamless pipe and at another end is configured to be welded to the seam-welded pipe to obtain a continuous pipe length of different pipes in the umbilical.

10. The umbilical according to claim 1, wherein the one or more predetermined locations are in a dynamic section of the umbilical located between a sea surface and a seabed, not including a bend area of the umbilical, and wherein the bend area comprises one or more of a sag bend, a hog bend, a touch down point or a bend stiffener.

11. The umbilical according to claim 1, wherein the one or more predetermined locations are in a static section of the umbilical at a seabed.

12. The umbilical according to claim 1, wherein the seamless pipe and the seam-welded pipe comprise different nominal cross-sectional geometries.

13. A method for arranging an umbilical between a sea surface offshore construction and a seabed installation, comprising:
   arranging an umbilical between a sea surface offshore construction and a seabed installation at a seabed, the umbilical comprising:

one or more longitudinal umbilical elements, including one or more of a filler element, a signal cable, a fiber optic, an electrical power cable, or a load carrying element; and a fluid pipe arranged within the umbilical, the fluid pipe extending a length from a first end of the fluid pipe to a second end of the fluid pipe, the fluid pipe including:

a first portion including a seamless pipe, wherein the first portion extends a first portion of the length; and a second portion including a seam-welded pipe, wherein the second portion extends a second portion of the length, wherein the first portion of the length and the second portion of the length do not overlap, wherein the first portion of the fluid pipe is spliced to the second portion of the fluid pipe at a predetermined location along the length of the fluid pipe, and wherein the one or more longitudinal umbilical elements and the fluid pipe are laid in a continuous helix within the umbilical;

arranging the first portion of the length in a dynamic area of the umbilical positioned between the sea surface offshore construction and the seabed; and arranging the second portion of the length in a static area on the seabed between the sea surface offshore construction and the seabed installation.

14. The method for arranging an umbilical according to claim 13, further comprising splicing of the first portion of the fluid pipe and the second portion of the fluid pipe by welding.

* * * * *